B. S. WOHLGEMUTH.
STOCK LEVEL TESTING ROD.
APPLICATION FILED MAY 24, 1918.
1,281,468.
Patented Oct. 15, 1918.
2 SHEETS—SHEET 1.
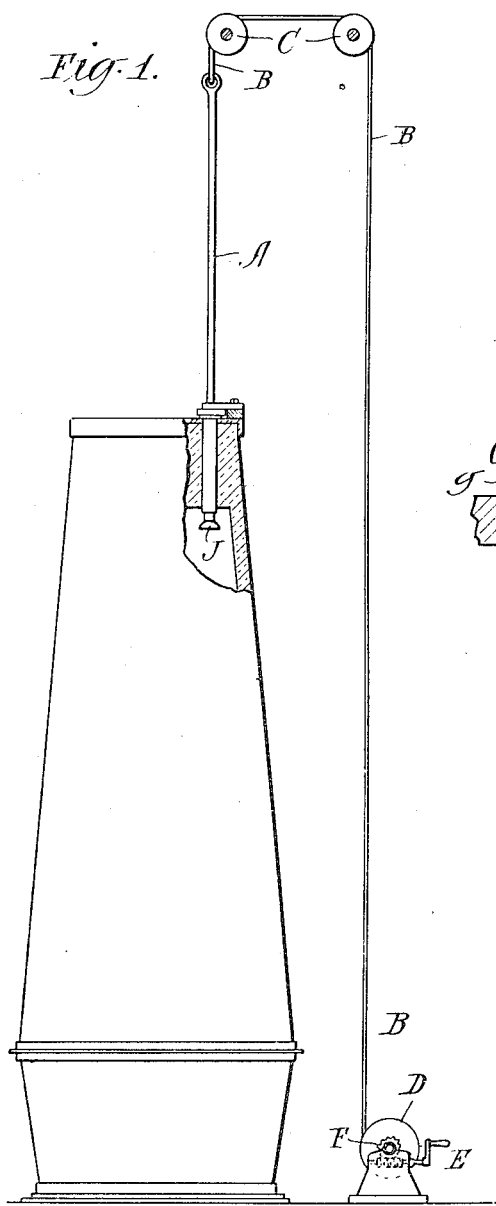
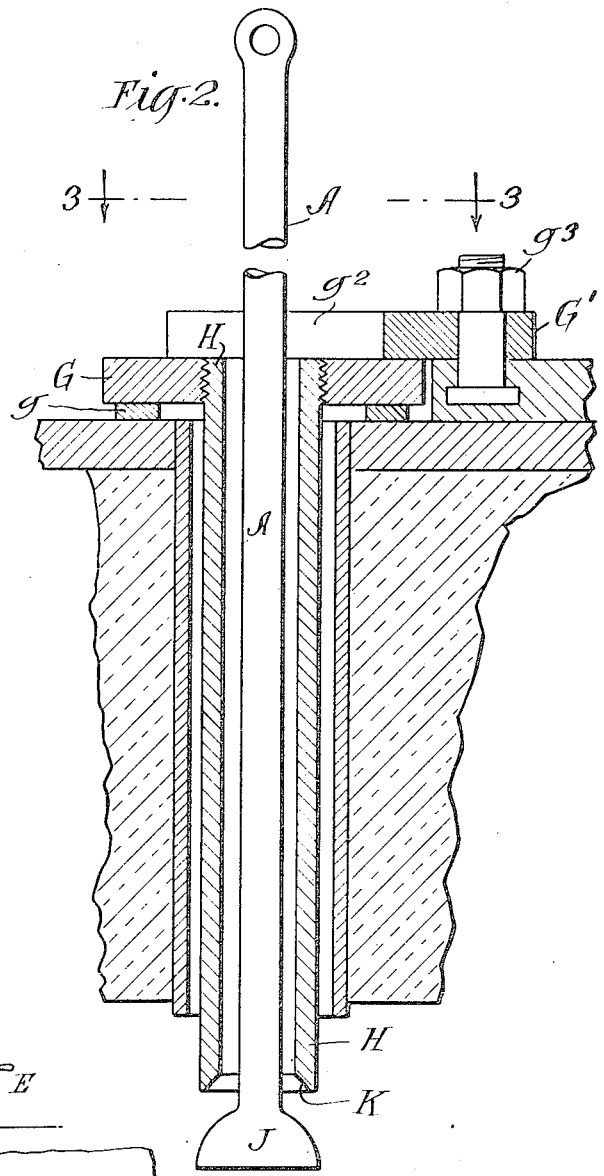
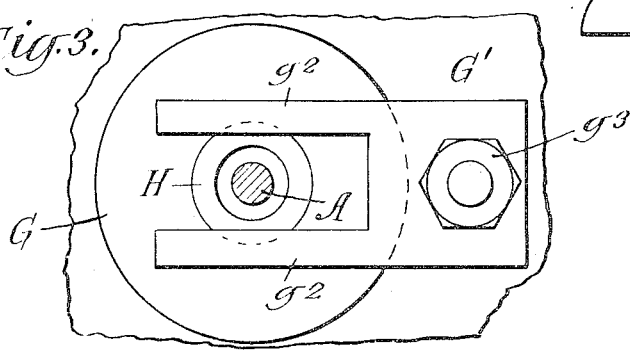
INVENTOR
B. S. WOHLGEMUTH
BY D. Anthony Usina
ATTORNEY

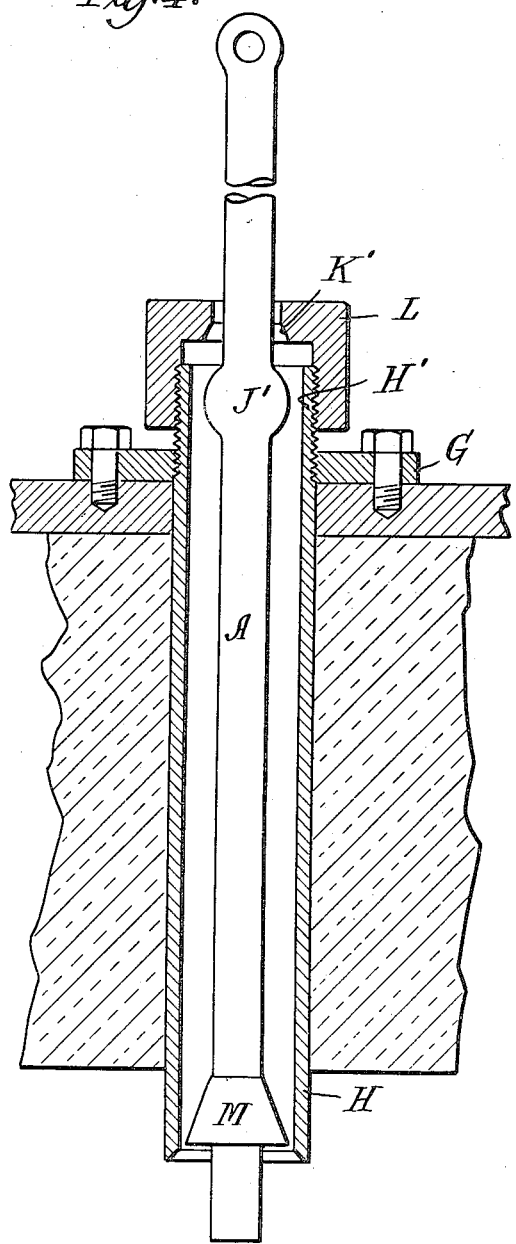

UNITED STATES PATENT OFFICE.

BERT S. WOHLGEMUTH, OF BELLAIRE, OHIO.

STOCK-LEVEL-TESTING ROD.

1,281,468.

Specification of Letters Patent.

Patented Oct. 15, 1918.

Application filed May 24, 1918. Serial No. 236,377.

*To all whom it may concern:*

Be it known that I, BERT S. WOHLGEMUTH, a citizen of the United States, and resident of Bellaire, Belmont county, Ohio, have invented certain new and useful Improvements in Stock-Level-Testing Rods, of which the following is a specification.

This invention relates to means for measuring the depth of stock charged into blast furnaces, kilns or the like containing hot gases and is particularly adapted to prevent the escape of such gases through the aperture for the test rod. The difficulty with the ordinary form of test rod is that it is necessary to leave so much space between the rod and the aperture through which it passes that there is a constant escape of gas therefrom which makes it very dangerous for workmen engaged in charging the furnace or performing other duties and also forms an avenue of escape for ore-dust and other finely divided solids which tend to clog the opening and prevent the vertical movement of the rod.

The objects of the invention will be apparent from the following description and drawings.

Figure 1 is a somewhat diagrammatic side elevation of a blast furnace showing my improved testing rod associated therewith;

Fig. 2 is an enlarged vertical section illustrating in detail one embodiment of the invention;

Fig. 3 is a horizontal section on line 3—3 of Fig. 2;

Fig. 4 is a similar enlarged view representing a modified form of the device.

Referring to Fig. 1 the testing rod A is suspended from a cable B passing over guide pulleys C which may be mounted in suitable bearings on any part of the superstructure of the furnace. A suitable windlass D conveniently mounted on the ground level is provided so that by operating the crank E the testing rod may be raised or lowered in the obvious manner, the crank E being connected with the windlass by suitable worm gearing indicated at F. Secured to the superstructure of the furnace is a base plate G into which is threaded a downwardly depending tube H the interior diameter of which is slightly greater than the diameter of the test rod A to allow for a generous expansion and contraction due to the excessive heat and yet permit the test rod to move freely within the tube. An enlarged valve head J formed on the lower end of the test rod is adapted to coact with a valve seat K provided at the lower end of the tube H.

The base G is seated on an annular ring $g$ and is securely held in place by a clamp $G'$ having arms $g^2$ which straddle the test rod as shown in Fig. 3, the clamp $G'$ being secured to the superstructure of the furnace by a suitable T-bolt and nut $g^3$. As thus constructed the test rod A and tube H can be easily removed for cleaning, replacement or repair when necessary by simply removing the nut $g^3$ and disconnecting the clamp $G'$.

When it is desired to gage the level of charge within the furnace, the windlass is operated to lower the test rod which will descend until its headed end J strikes the top of the charge, the length of cable paid off by the windlass indicating the travel of the test rod. When the rod is drawn up the head J thereof will come into contact with the seat K and effectively seal the opening and thereby prevent the escape of gas.

Instead of forming a head at the end of the rod I may form an enlarged portion $J'$ intermediate the ends of the rod (Fig. 4) for coaction with the valve seat $K'$ of the head L which is screwed on a threaded end $H'$ of the tube H extending above the top of the furnace. By unscrewing the head L the rod can be easily removed for repair or replacement when necessary or desirable. In this form of the device I also form a frusto-conical head M near the end of the test rod, the diameter of which is slightly less than the bore of the tube H. The head M acts as a barrier to restrict the passageway at the lower end of the tube and also to prevent the entrance of material which might interfere with the movement of the test rod.

Heretofore test rods have been constructed of plain cylindrical bars which were lowered into the furnace by a suitable suspension means through a comparatively large opening in the top of the furnace to permit the rod to freely pass therethrough and in practice the escape of the gas through the aperture has proven very dangerous to furnace operators and the ore-dust and other stock carried by the escaping gases very often clogged up the test rod aperture and made it necessary for workmen to frequently remove the test rods at very inconvenient times and at the risk of receiving serious injury.

By the utilization of my improved test rod having a sealing head attached thereto, the gases are prevented from escaping around the test rod for the greater part of the time that the furnace is in operation, the only time that the escape of gas is possible being when the rod is lowered for the purpose of gaging the level of stock, within the furnace. The advantages of the construction herein disclosed will be clear to those skilled in the art.

It is obvious that changes may be made in the form of the device herein described without departing from the spirit and scope of the invention as defined in the subjoined claims.

What I claim is:—

1. In a device of the class described a casing fixed against vertical movement having a valve seat at its lower end, and a test rod movable vertically in said casing and fixed against lateral movement except for a slight play to allow for expansion and contraction and prevent the rod binding in the casing, the rod having a valve adapted to be pulled up against the seat in the casing to prevent the escape of gas and solids through the casing.

2. In a device of the class described, a casing fixed against vertical movement having a valve seat at its lower end, and a test rod movable vertically in said casing the rod having a valve arranged thereon so that it may be pulled up forcibly to seal the end of said casing and means for securing the casing which will permit the rod and casing to be removed together for replacement or repair.

3. In a device of the class described a casing fixed against vertical movement and having a valve seat, and a test rod movable vertically in said casing and fixed against lateral movement except for a slight play to allow for expansion and contraction and to prevent the rod binding in the casing, the rod having a valve adapted to be pulled up against the seat in the casing to prevent the escape of gas and solids through the casing and rod lifting means on the upper end of the test rod.

4. In a device of the class described, a casing having a valve seat at its lower end, a test rod having a valve for coaction with the seat formed on said casing and a detachable clamp to normally prevent the vertical movement of said casing, the parts being so arranged that said casing, supporting base and test rod can all be removed together by disconnecting said clamp.

In witness whereof, I have hereunto signed my name.

BERT S. WOHLGEMUTH.